United States Patent [19]

Gonnord et al.

[11] Patent Number: 4,562,806
[45] Date of Patent: Jan. 7, 1986

[54] CYLINDER HEAD FOR INTERNAL COMBUSTION ENGINES WITH COMPRESSION IGNITION

[75] Inventors: Jacques Gonnord, Rueil Malmaison; Bernard Guillot, Suresnes, both of France

[73] Assignee: Regie Natonale des Usines Renault, Boulogne-Billancourt, France

[21] Appl. No.: 594,914

[22] Filed: Mar. 29, 1984

[30] Foreign Application Priority Data

Mar. 29, 1983 [FR] France ............... 83 05108

[51] Int. Cl.⁴ .............................................. F02F 1/00
[52] U.S. Cl. .................. 123/270; 123/193 H; 123/668
[58] Field of Search .............. 123/193 H, 270, 188 S, 123/188 M, 193 CH, 668, 669, 271; 164/98; 29/156.4 WL, 527.5

[56] References Cited

U.S. PATENT DOCUMENTS

| | | | |
|---|---|---|---|
| 3,820,523 | 6/1974 | Showalter et al. | 123/669 |
| 4,207,660 | 6/1980 | Rao et al. | 123/193 H |
| 4,254,621 | 3/1981 | Nagumo | 123/193 H |
| 4,300,494 | 11/1981 | Graiff et al. | 123/193 H |
| 4,341,826 | 7/1982 | Prewo et al. | 123/193 R |
| 4,346,556 | 8/1982 | Rice et al. | 123/193 H |
| 4,425,884 | 1/1984 | Thring et al. | 123/275 |
| 4,453,527 | 6/1984 | Wade | 123/193 H |

FOREIGN PATENT DOCUMENTS

| | | | |
|---|---|---|---|
| 1238335 | 7/1960 | France . | |
| 0011306 | 1/1977 | Japan | 123/271 |
| 685809 | 1/1953 | United Kingdom . | |
| 731013 | 4/1980 | U.S.S.R. | 123/193 H |

OTHER PUBLICATIONS

New Ceramics Advance Adiabatic Diesel Engine, Marmach et al., Feb. 1983, pp. 68-72.

Primary Examiner—Craig R. Feinberg
Assistant Examiner—David A. Okonsky
Attorney, Agent, or Firm—Oblon, Fisher, Spivak, McClelland & Maier

[57] ABSTRACT

A cylinder head for internal combustion engines with compression ignition, is of the type having precombustion chambers, intake and exhaust ports, and valve guides and seats respectively associated with the cylinders of the engine. According to the invention, the precombustion chambers the exhaust ports and the valve seats of this cylinder head are entirely cast and inserted into this cylinder head during casting and without machining. Application is particularly to the manufacture of diesel engines with precombustion chambers.

2 Claims, 5 Drawing Figures

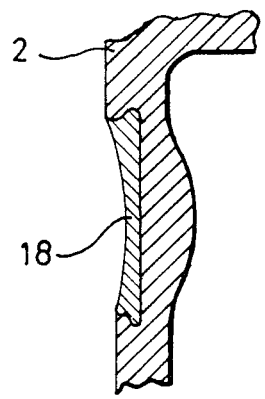
FIG. 4
FIG. 5
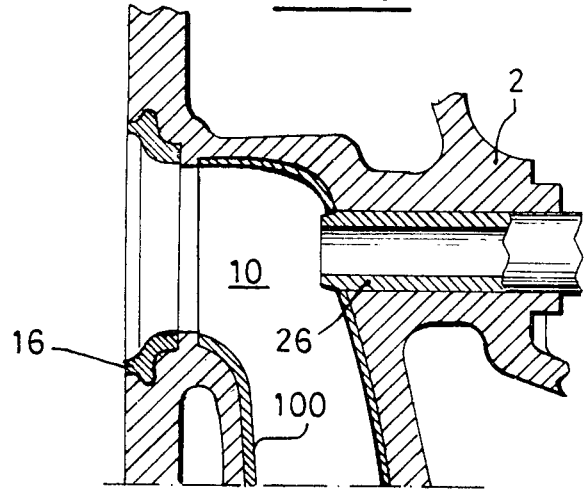

CYLINDER HEAD FOR INTERNAL COMBUSTION ENGINES WITH COMPRESSION IGNITION

BACKGROUND OF THE INVENTION

This invention relates to cylinder heads for internal combustion engines with compression ignition, of the type having precombustion chambers, intake and exhaust ports, and valve guides and seats respectively associated with the cylinders of the engine.

It is known in the manufacture of cylinder heads, cast or not under pressure, to use molded cores to form intake and exhaust ports and to insert valve seats and precombustion chambers into this cylinder head.

French Pat. No. 2,165,646 describes a typical example of this inserted valve seat, intended to be attached in the cylinder heads of internal combustion engines. This valve seat has a self-tapping thread.

French Pat. Nos. 2,393,147 and 2,393,148 show internal combustion engines of the diesel type with an injection and ignition precombustion chamber in which the precombustion chamber is made in a mounted part inserted into the cylinder head.

It is also known from British Pat. No. 1,075,951 how to make intake and exhaust ports using refractory metal inserts one of whose ends is shaped so as to constitute a valve seat.

Moreover, West German Pat. No. 2,602,434 emphasizes the essential advantage that the insert offers during the casting of a cylinder head for an internal combustion engine, i.e. intake and exhaust ports covered with a ceramic material make possible a good heat insulation.

In French Pat. No. 2,423,643, a heat conducting insert plate is used which has a hollow space between the seats and enlarged areas thoroughly applied on the thoroughly cooled areas of the cylinder head to protect the areas between the seats and to remove the heat.

Current manufacturing techniques do not make it possible to manufacture a particularly simple and economical cylinder head for a diesel type engine with precombustion chambers, to the extent that the precise machining of this cylinder head makes it difficult and costly to insert the precombustion chamber or the valve seats.

SUMMARY OF THE INVENTION

The invention, therefore, has as its object to eliminate said drawbacks and to achieve substantial savings during cylinder head production.

For this purpose, the invention proposes a cylinder head for an internal combustion engine with compression ignition of the type with precombustion chambers in which, according to a feature of the invention, the precombustion chambers, exhaust ports and valve seats entirely cast and inserted during casting into the cylinder head without machining.

The insertion of said elements simplifies and makes profitable in large measure the manufacture of the cylinder head due to the elimination of numerous machining phases.

The insertion of the exhaust ports makes it possible, in a way known in the art, to optimize the shape of these exhaust ports and the flow of the gases.

On the other hand, the insertion of the precombustion chambers provides numerous new advantages, particularly:

1. The thickness of these precombustion chambers can be kept nearly constant;
2. A better fluid tightness can be assured at the cylinder head seal and the precombustion chambers;
3. It no longer proves necessary to design a round part, which provides an additional degree of freedom in the design of the precombustion chambers;
4. The recesses capable of generating hydrocarbon emissions peculiar to the inserted precombustion chambers are eliminated, which advantageously reduces pollution;
5. The ceramic materials which can be envisaged; working essentially under compression, are not suited to machined and inserted precombustion chambers.

According to another feature of the invention, a one-piece unit consisting of an intake valve seat and an exhaust valve seat, connected by a connecting part, is associated with each pair of intake and exhaust ports.

This arrangement makes it possible, in addition to the reduction in machining and of manufacturing costs, to consolidate and thermally protect the center of the combustion chamber or inter-valve connection bar, particularly for engines with a high heat load.

According to another feature of the invention, the precombustion chambers, exhaust ports and valve seats are made of ceramic materials. These materials exhibit heat-insulating and anti-wear characteristics greater than those of refractory metal materials.

BRIEF DESCRIPTION OF THE DRAWINGS

Other features and advantages of this invention will appear more clearly from reading the following description of an embodiment given solely by way of example, and represented in the accompanying drawings in which:

FIG. 4 is a section along 4—4 of the cylinder head according to FIG. 1, showing an inter-valve connecting bar with a part for connecting the intake and exhaust seats; and FIG. 5 is a section along 5—5 of the cylinder head according to FIG. 1, showing an exhaust port and associated valve and guide seats.

DETAILED DESCRIPTION OF THE PREFERRED EMBODIMENTS

Figure 1:
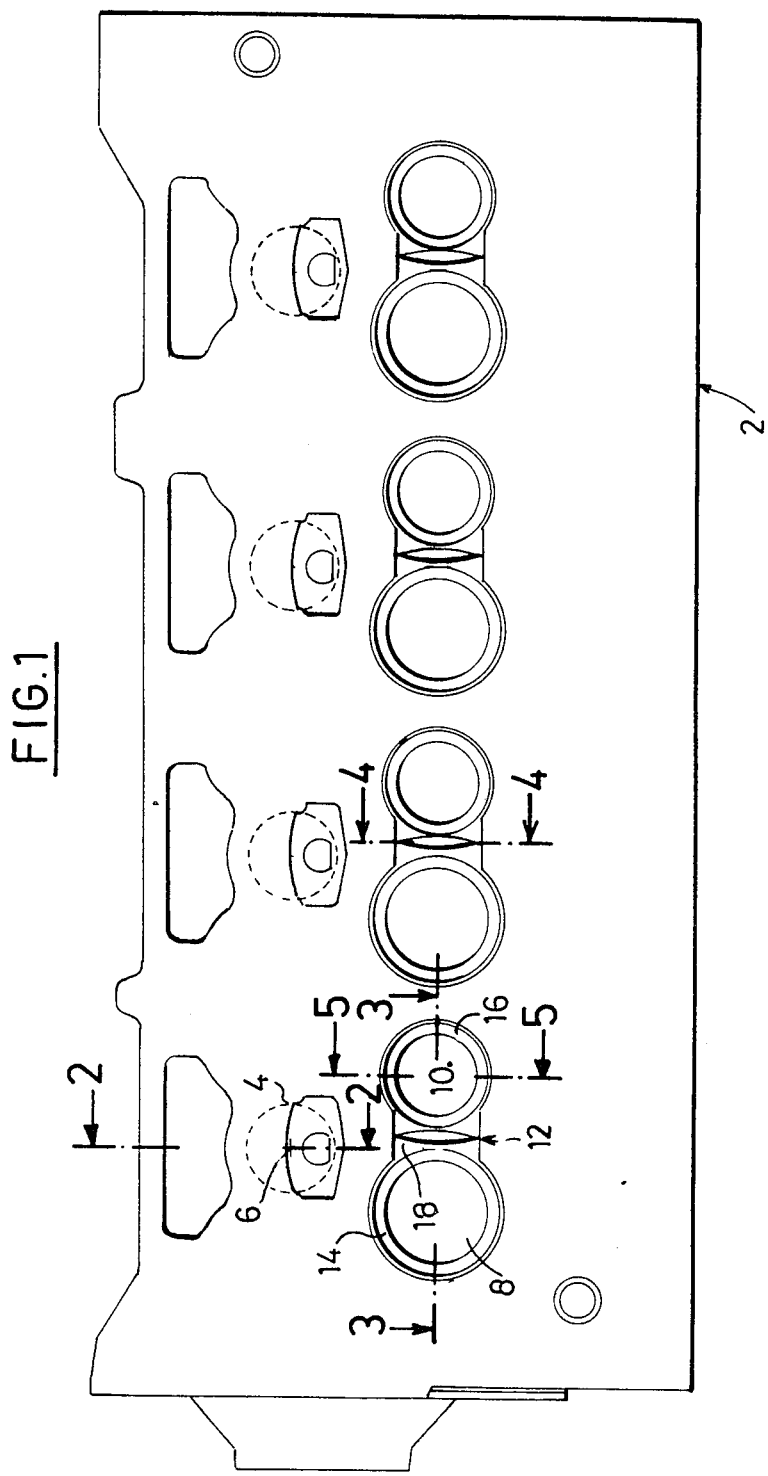
FIG. 1 is a bottom view of a cylinder head for a diesel engine with precombustion chambers according to the invention.

According to the illustrated embodiment of the invention, a cylinder head 2 for a four cylinder internal combustion engine with compression ignition of the type having injection and self-ignition precombustion chambers, is shown in FIG. 1. Also shown are precombustion chambers 4 having axes 6 and four pairs of intake ports 8 and exhaust ports 10. A one-piece unit 12 consisting of an intake valve seat 14 and an exhaust valve seat 16 connected by an inter-seat connecting part 18 is associated with each pair of intake 8 and exhaust ports 10.

Figure 2:
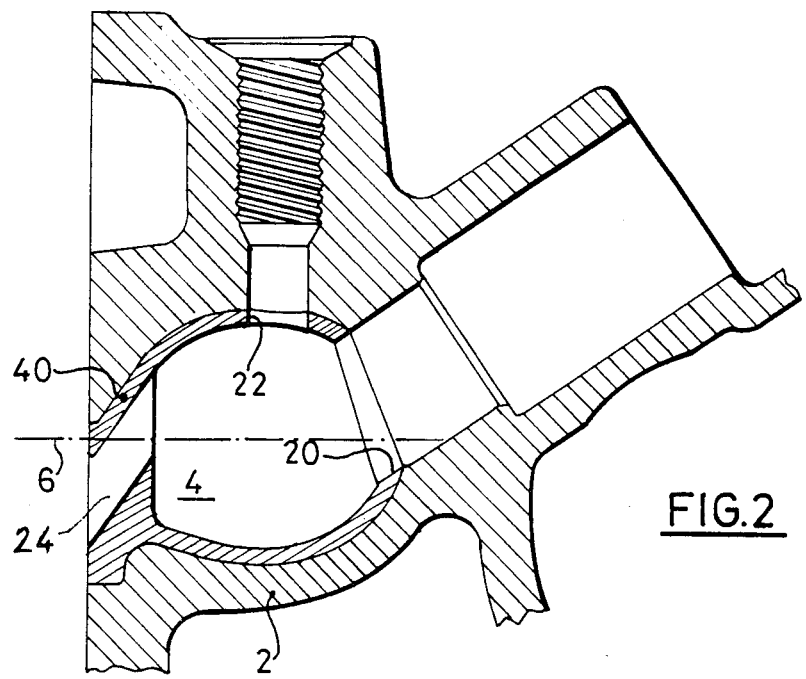
FIG. 2 is a view in partial section along 2—2 of the cylinder head according to FIG. 1, showing a precombustion chamber.

FIG. 2 shows that each precombustion chamber 4 of the cylinder head 2 is formed by an insert 40. This precombustion chamber 4 has a first orifice 20 and a second orifice 22 that make possible respectively the injection of the fuel and the heating of this fuel.

The precombustion chamber 4 communicates by a channel 24 having a reduced section with a main combustion chamber of the engine, not shown. The fuel can be preheated in the precombustion chamber 4 significantly to facilitate its self-ignition. This heating is clearly improved by an excellent heat insulation of the precombustion chamber 4 defined by insert 40 which is optionally made of ceramic material and by an improved fluid tightness at the seal of the cylinder head.

Figure 3:
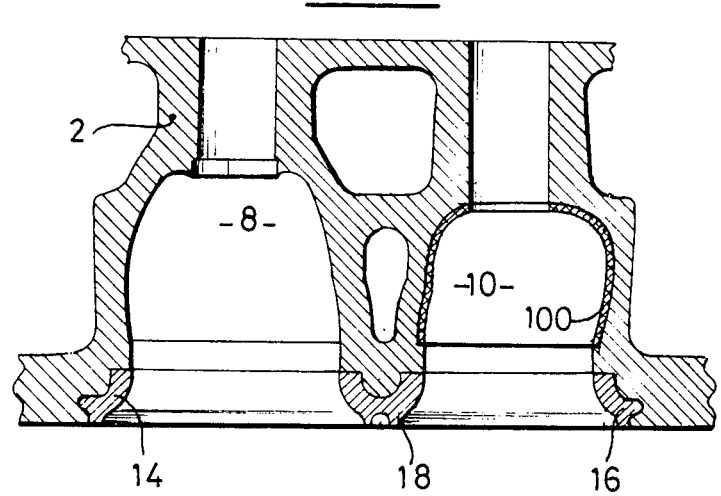
FIG. 3 is a section along 3—3 of the cylinder head according to FIG. 1, showing a one-piece unit of intake and exhaust seats.

FIG. 3 shows a longitudinal section of the one-piece unit 12 which joins intake valve seat 14 to exhaust valve seat 16 by an inter-seat part 18 whose cross section is illustrated in FIG. 4. The insertion of this unit 12 advantageously eliminates the matching of the cylinder head normally necessary for the fitting or the screwing of ordinarily separate valve seats.

Inter-seat part 18, ordinarily subjected to strong thermal stresses, is thus suitably protected from high temperatures and cracks which are no longer formed there.

In FIGS. 3 and 5 then is shown an insert 100 of ceramic material which delimits exhaust port 10 which is countersunk in cylinder head 2. This exhaust insert 100 can easily exhibit a predetermined shape and section to optimize the discharge of gases in the exhaust port 10.

It was not judged useful to insert intake port 8 during casting. Valve guides 26 can be optionally inserted during casting of the head together with exhaust inserts 100 or not.

Obviously, numerous modifications and variations of the present invention are possible in light of the above teachings. It is therefore to be understood that within the scope of the appended claims, the invention may be practiced otherwise than as specifically described herein.

We claim:

1. A cylinder head for an internal combustion engine having compression ignition, said cylinder head comprising:
    a one piece cylinder head member;
    ceramic precombustion chambers;
    ceramic intake and exhaust ports and ceramic valve seats and guides respectively associated with respective cylinders of the engine, wherein said precombustion chambers, exhaust ports and valve seats comprise elements entirely cast and positioned within said cylinder head member during casting of said cylinder head member so as to be free from machining while within said cylinder head member, and wherein said precombustion chambers define holes for fuel injection into said precombustion chambers for communication with a glow plug and for communication with a main combustion chamber of said engine, said precombustion chambers being in surface contact with said cylinder head member, and being narrow adjacent said hole for communication with said main combustion chamber, as compared with a remaining portion of said precombustion chambers, whereby the shape of said precombustion chambers prevents removal thereof from said cylinder head members.

2. The cylinder head according to claim 1, wherein a one-piece unit, consisting of an intake valve seat and an exhaust valve seat connected to said intake valve seat by an inter-seat part, is associated with each pair of said intake and exhaust ports.

* * * * *